(12) United States Patent
Hamada

(10) Patent No.: US 10,965,181 B2
(45) Date of Patent: Mar. 30, 2021

(54) ELECTRIC DRIVE DEVICE AND ELECTRIC POWER STEERING DEVICE

(71) Applicant: HITACHI AUTOMOTIVE SYSTEMS, LTD., Hitachinaka (JP)

(72) Inventor: Keiji Hamada, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/968,222

(22) PCT Filed: Sep. 7, 2018

(86) PCT No.: PCT/JP2018/033146
§ 371 (c)(1),
(2) Date: Aug. 7, 2020

(87) PCT Pub. No.: WO2019/159405
PCT Pub. Date: Aug. 22, 2019

(65) Prior Publication Data
US 2021/0036574 A1    Feb. 4, 2021

(30) Foreign Application Priority Data
Feb. 14, 2018  (JP) .............................. JP2018-023752

(51) Int. Cl.
*H02K 5/10* (2006.01)
*H02K 11/33* (2016.01)
(Continued)

(52) U.S. Cl.
CPC ............. *H02K 5/10* (2013.01); *B62D 5/0463* (2013.01); *B62D 15/0225* (2013.01); *H02K 11/33* (2016.01); *H02K 7/003* (2013.01)

(58) Field of Classification Search
CPC .......... H02K 5/10; H02K 11/33; H02K 7/003; B62D 5/0463; B62D 15/0225
(Continued)

(56) References Cited

U.S. PATENT DOCUMENTS 10,340,765 B2 *   7/2019  Yamasaki ................ H02K 5/10
10,554,100 B2 *   2/2020  Hamada ................... H02K 5/18
(Continued)

FOREIGN PATENT DOCUMENTS

JP    S54-57445 U    4/1979
JP    2005-27384 A   1/2005
(Continued)

OTHER PUBLICATIONS

International Search Report issued in corresponding application No. PCT/JP2018/033146 dated Dec. 4, 2018 with English translation.
(Continued)

*Primary Examiner* — John K Kim
(74) *Attorney, Agent, or Firm* — Foley & Lardner LLP

(57) ABSTRACT

An electric drive device includes a housing with a motor-housing-side annular groove portion formed on an outer peripheral surface of an end surface portion of the housing, on an opposite side to an output portion of a rotation shaft of an electric motor section. The groove portion is formed by an annular groove retreating inward in the radial direction orthogonal to the axial line of the housing. A metal-cover-side distal end portion is formed at the opening end of a metal cover covering an electronic control unit that controls the electric motor section, and faces the groove from the outer side. A space between the groove portion and the distal end portion is filled with a liquid sealant, and an annular inclined surface is inclined so it is widened outward in the radial direction of the metal cover is formed on the inner peripheral surface of the groove portion.

10 Claims, 11 Drawing Sheets

(51) Int. Cl.
   *H02K 7/00*       (2006.01)
   *B62D 15/02*      (2006.01)
   *B62D 5/04*       (2006.01)

(58) Field of Classification Search
   USPC .................................................. 310/68 R, 89
   See application file for complete search history.

(56) References Cited

U.S. PATENT DOCUMENTS

| | | | |
|---|---|---|---|
| 10,654,517 B2* | 5/2020 | Fujimoto | B62D 5/0421 |
| 10,668,943 B2* | 6/2020 | Fujimoto | B62D 6/10 |
| 10,668,944 B2* | 6/2020 | Fujimoto | H02K 11/33 |
| 2013/0099609 A1* | 4/2013 | Ikeno | H02K 11/33 |
| | | | 310/52 |
| 2015/0180316 A1 | 6/2015 | Maeshima | |
| 2016/0218583 A1 | 7/2016 | Hayashi | |
| 2017/0066470 A1* | 3/2017 | Asao | B62D 5/0406 |
| 2018/0183294 A1* | 6/2018 | Nishikawa | H02K 15/12 |

FOREIGN PATENT DOCUMENTS

| | | |
|---|---|---|
| JP | 2015-134598 A | 7/2015 |
| JP | 2016-140149 A | 8/2016 |
| WO | WO-2017/060999 A1 | 4/2017 |

OTHER PUBLICATIONS

Written Opinion issued in corresponding application No. PCT/JP2018/033146 dated Dec. 4, 2018 with English translation.

* cited by examiner

ELECTRIC DRIVE DEVICE AND ELECTRIC POWER STEERING DEVICE

TECHNICAL FIELD

The present invention relates to an electric drive device and an electric power steering device, and particularly to an electric drive device and an electric power steering device incorporating an electronic control device.

BACKGROUND TECHNOLOGY

In a general industrial machine field, although a mechanical system control element is driven by an electric motor, recently, a so-called mechanically and electrically-integrated electric drive device in which an electronic control unit composed of a semiconductor element for controlling the rotation speed and the rotation torque of an electric motor is integrally incorporated in the electric motor has been adopted.

As an example of the mechanically and electrically-integrated electric drive device, for example, in an electric power steering device of a vehicle, the rotation direction and the rotation torque of a steering shaft which is rotated by the operation of a steering wheel by a driver are detected, and, based on the detected values, an electric motor is driven so as to rotate in the same direction as the rotation direction of the steering shaft, so as to generate steering assist torque. In order to control the electric motor, an electronic control unit (ECU: Electronic Control Unit) is provided to the power steering device.

As a conventional electric power steering device, for example, one described in a Japanese Patent Application publication No. 2015-134598 (patent document 1) has been known. In the patent document 1, an electric power steering device composed of an electric motor section and an electronic control unit is described. An electric motor of the electric motor section is accommodated in a cylindrical motor housing made of, for example, an aluminum alloy, and a substrate mounting electronic components of the electronic control unit is attached to a heat sink which functions as an ECU housing disposed on the opposite side to the output shaft in the axial direction of the motor housing.

The substrate attached to the heat sink is provided with a power source circuit part, a power conversion circuit part having a power switching element, such as IGBT or MOSFET for driving and controlling the electric motor, and a control circuit part for controlling the power switching element, and the output terminal of the power switching element is electrically connected with the input terminal of the electric motor via a bus bar.

Then, power is supplied from a power source to the electronic control part attached to the heat sink via a connector case made of synthetic resin, and detected signals of a driving condition and the like are supplied thereto from detection sensors. The connector case functions as a lid, and is fixed to the outer peripheral surface of the heat sink with fixing screws so as to be fixed to tightly close the heat sink.

In addition, although, as an electric drive device integrating an electronic control device, an electric brake and an electrohydraulic controller for various hydraulic controls have been known, in the following explanation, an electric power steering device will be explained as a representative.

PRIOR ART REFERENCE

Patent Document

Patent Document 1: Japanese Patent Application Publication 2015-134598

SUMMARY OF THE INVENTION

Problem(s) to be Solved by the Invention

Here, in an electric power steering device having such a configuration shown in the patent document 1, a motor housing, a heat sink and a connector case are co-fastened to each other with fixing screws inserted through fixing portions formed so as to protrude to the outer peripheral side.

Then, seal members, such as O-rings, for liquid tightness are used between the motor housing and the heat sink and between the heat sink and the connector case. Moreover, the fixing screws fix between the motor housing and the heat sink and between the heat sink and the connector case. Here, in a case where the heat sink is not used, an O-ring is interposed between the motor housing and the connector case, and are fixed to each other with fixing screws.

By the way, a vehicle often travels on a road on which snow melting agents are scattered or on a road located close to a coastline. Consequently, in a case where a vehicle travels on a road in a state in which snow is melted or on a road located close to a coastline in the rain, salt water often enters under the floor of the vehicle. In this case, in a liquid-tight structure using only an O-ring, since a fitting gap is substantially formed to the area where the O-ring is disposed, salt water enters into the fitting gap, and an accommodation portion for the O-ring is corroded. In the worst case, salt water enters into the inside due to liquid-tightness failure, and then electrical reliability is reduced.

Therefore, to solve such a problem, for example, as shown in FIG. 16, a configuration is considered in which an electronic control unit is disposed at the end surface portion of a motor housing, and the opening end of a metal cover covering it is joined to the end surface of the motor housing by interposing a liquid sealant.

In FIG. 16, an annular sealant accommodation groove 61 is formed on the outer peripheral surface of a motor housing 60 so as to retreat inward, and after this sealant accommodation groove 61 is filled with a liquid sealant 62, a metal-cover-side annular distal end portion 64 of a metal cover 63 is disposed so as to cover the liquid sealant accommodation groove 61, and thereby the motor housing 60 and the metal cover 63 are liquid-tightly joined to each other.

By the way, the liquid sealant 62 has adhesiveness and viscosity so as to keep the shape at the time when being applied, and consequently, the space between the metal-cover-side annular distal end portion 64 and the sealant accommodation groove 61 can be sealed with the liquid sealant 62. However, when the metal-cover-side annular distal end portion 64 is pushed in a direction shown by an arrow toward the end surface of the motor housing 60, tensile force is applied in one direction (lower side direction shown by the arrow in the drawing) of the liquid sealant 62 which comes in contact with the inner peripheral surface of the metal-cover-side annular distal end portion 64 caused by the adhesiveness and viscosity of the liquid sealant 62.

Consequently, when the metal-cover-side annular distal end portion 64 is pushed toward the end surface of the motor housing 60, a phenomenon occurs, phenomenon in which the liquid sealant 62 filled in the sealant accommodation groove 61 is pulled and moved with the movement of the inner peripheral surface of the metal-cover-side annular distal end portion 64. With this, a space P in which the liquid sealant 62 does not exist in the sealant accommodation groove 61 is formed in the interface between the liquid sealant 62 and the inner peripheral surface side of the metal-cover-side annular distal end portion 64.

As a result of this, a seal length becomes short, the possibility that salt water and the like enter into the inside of the metal cover 63 becomes high, and then the problem that mechanical and electrical reliability is reduced newly arises.

Therefore, an electric drive device and an electric power steering device capable of coping with such a problem have been required. A main object of the present invention is to provide a new electric drive device and electric power steering device in which mechanical and electrical reliability is increased.

Means for Solving the Problem(s)

In a feature of the present invention, the present invention includes: a motor-housing-side annular groove portion formed on the outer peripheral surface of the end surface portion of an motor housing which is located on an opposite side to the output portion of a rotation shaft of an electric motor, and formed by an annular groove retreating inward in the radial direction orthogonal to the axial line of the motor housing; and a cover-side annular distal end portion formed at the opening end of a cover covering an electronic control unit for controlling the electric motor, and facing the annular groove of the motor-housing-side annular groove portion from the outside, wherein a liquid sealant is filled in the space between the motor-housing-side annular groove portion and the cover-side annular distal end portion in a state in which the cover-side annular distal end portion is disposed so as to face the motor-housing-side annular groove portion, and wherein an annular inclined surface inclined so as to be widened outward in the radial direction of a cover is formed on the inner peripheral surface of the cover-side annular distal end portion.

Effect of the Present Invention

According to the present invention, since the annular inclined surface inclined so as to be widened outward in the radial direction of the cover is formed on the inner peripheral surface of the cover-side annular distal end portion, when the cover-side annular distal end portion is pushed toward the end surface of the motor housing, pushing-in force acting on the liquid sealant filled in the motor-housing-side annular groove portion is dispersed, the movement of the liquid sealant caused by being pulled with the movement of the inner peripheral surface of the cover-side annular distal end portion is suppressed, and consequently, the formation of the space in which the liquid sealant does not exist can be suppressed.

MODE FOR IMPLEMENTING THE INVENTION

In the following, although embodiments of the present invention will be explained in detail by using drawings, the present invention is not limited to the following embodiments, and various variations and applications are included in a scope of a technical concept of the present invention.

Figure 1:
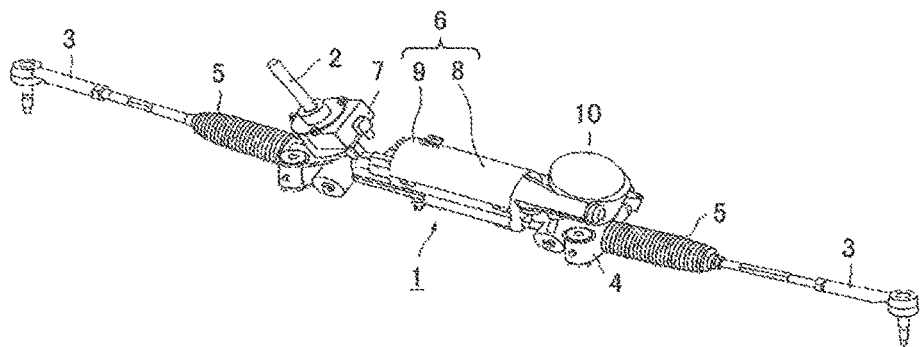
FIG. 1 is a perspective view of a whole steering apparatus as an example to which the present invention is applied.

Before explaining an embodiment of the present invention, as an example to which the present invention is applied, the configuration of a steering apparatus will be simply explained by using FIG. 1.

First, a steering apparatus for steering front wheels of a vehicle will be explained. A steering apparatus 1 is configured as shown in FIG. 1. A pinion which is not shown in the drawings is provided to the lower end of a steering shaft 2 connected to a steering wheel which is not shown in the drawings, and this pinion meshes with a long rack extending in a vehicle body right and left direction which is not shown in the drawings. Tie rods 3 for steering front wheels in right and left directions are connected to the respective both ends of the rack, and the rack is covered with a rack housing 4. In addition, rubber boots 5 are provided between the rack housing 4 and the tie rods 3.

An electric power steering device 6 is provided for assisting torque at the time when the turning operation of the steering wheel is performed. That is, a torque sensor 7 for detecting a rotation direction and a rotation torque of the steering shaft 2 is provided, and there are provided an electric motor section 8 for applying steering auxiliary force to the rack via a gear 10 based on the detected values of the torque sensor 7 and an electronic control unit (ECU) 9 for controlling an electric motor disposed in the electric motor section 8. Three parts in the outer periphery on the output shaft side of the electric motor section 8 of the electric power steering device 6 are connected to the gear 10 via screws which are not shown in the drawings, and the electronic control unit 9 is provided on the opposite side to the output shaft of the electric motor section 8.

In the electric power steering device 6, when the steering shaft 2 is operated and rotated in either direction by the operation of the steering wheel, the rotation direction and the rotation torque of the steering shaft 2 are detected by the torque sensor 7, and based on the detected values, a control circuit part calculates the driving operation quantity of the electric motor. The electric motor is driven by a power switching element of a power conversion circuit part based on the calculated driving operation quantity, and the output shaft of the electric motor drives the steering shaft 2 so as to be rotated in the direction same as an operation direction. The rotation of the output shaft is transmitted from the pinion not shown in the drawings to the rack not shown in the drawings via the gear 10, and the vehicle is steered. Such a configuration and action have already been known well, and further explanation is omitted.

Figure 16:
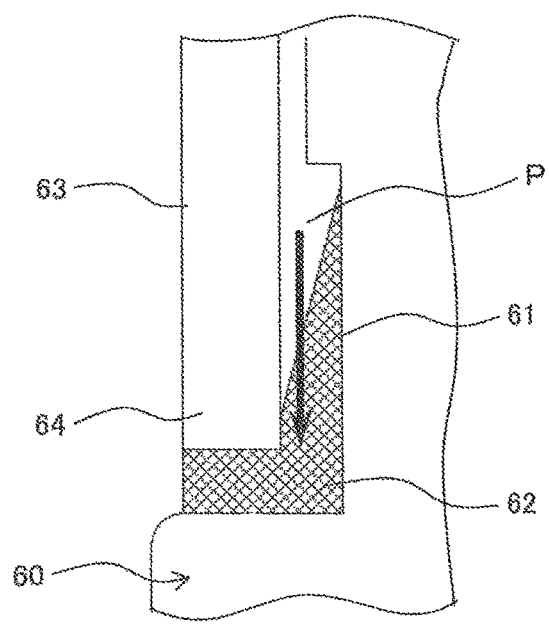
FIG. 16 is one to explain an object of the present invention, and is a sectional view showing the enlarged sectional view of a joining portion with a liquid sealant between the motor housing and the metal cover.

Again, in FIG. 16, when a metal-cover-side annular distal end portion 64 is pushed toward the end surface of a motor housing 60 in a direction shown by an arrow, tensile force is applied to a liquid sealant 62 which comes in contact with the inner peripheral surface of the metal-cover-side annular distal end portion 64 caused by the adhesiveness and viscosity of the liquid sealant 62.

Consequently, when the metal-cover-side annular distal end portion 64 is pushed toward the distal surface of the motor housing 60, a phenomenon occurs, phenomenon in which the liquid sealant 62 filled in a sealant accommodation groove 61 is pulled and moved with the movement of the inner peripheral surface of the metal-cover-side annular distal end portion 64. With this, a space P in which the liquid sealant 62 does not exist is formed in the sealant accommodation groove 61, as a result of which a seal length becomes short, the possibility that salt water and the like enter into the inside of a metal cover 63 becomes high, and the problem that mechanical and electrical reliability is reduced newly occurs.

Against such a background, in the present invention, an electric power steering device having the following configuration is proposed.

The present invention includes: a motor-housing-side annular groove portion formed on the outer peripheral surface of the end surface portion of an motor housing which is located on an opposite side to the output portion of the rotation shaft of an electric motor, and formed by an annular groove retreating inward in the radial direction orthogonal to the axial line of the motor housing; and a cover-side annular distal end portion formed at the opening end of a cover covering an electronic control unit for controlling the electric motor, and facing the annular groove of the motor-housing-side annular groove portion from the outside, wherein a liquid sealant is filled in the space between the motor-housing-side annular groove portion and the cover-side annular distal end portion in a state in which the cover-side annular distal end portion is disposed so as to face the motor-housing-side annular groove portion, and wherein an annular inclined surface inclined so as to be widened outward in the radial direction of the cover is formed on the inner peripheral surface of the cover-side annular distal end portion.

According to the above configuration, since the annular inclined surface inclined so as to widened to the outer side in the radial direction of the metal cover is formed on the inner peripheral surface of the metal-cover-side annular distal end portion, when the metal-cover-side annular distal end portion is pushed toward the end surface of the motor housing, pushing-in force applied to the liquid sealant filled in the motor-housing-side annular groove portion is dispersed, as a result of which the liquid sealant is suppressed from being moved caused by being pulled with the movement of the inner peripheral surface of the metal-cover-side annular distal end portion, and the formation of the space in which the liquid sealant does not exist is suppressed.

First Embodiment

In the following, a specific configuration of an electric power steering device which becomes an embodiment of the present invention will be explained in detail by using FIG. 2 to FIG. 12.

Figure 2:
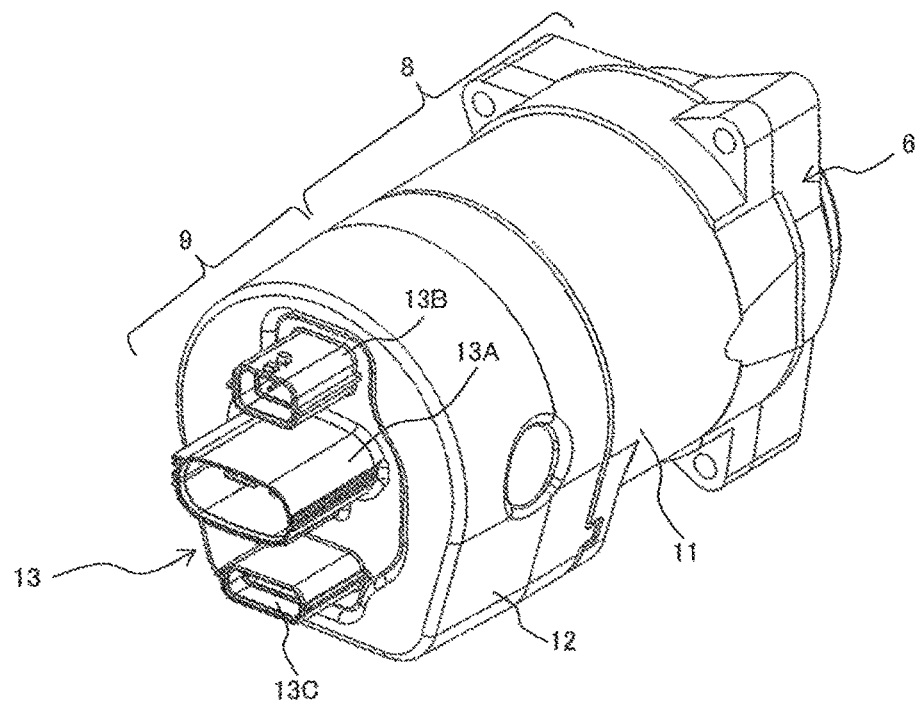
FIG. 2 is a perspective view showing the whole shape of an electric power steering device according to an embodiment of the present invention.
Figure 3:
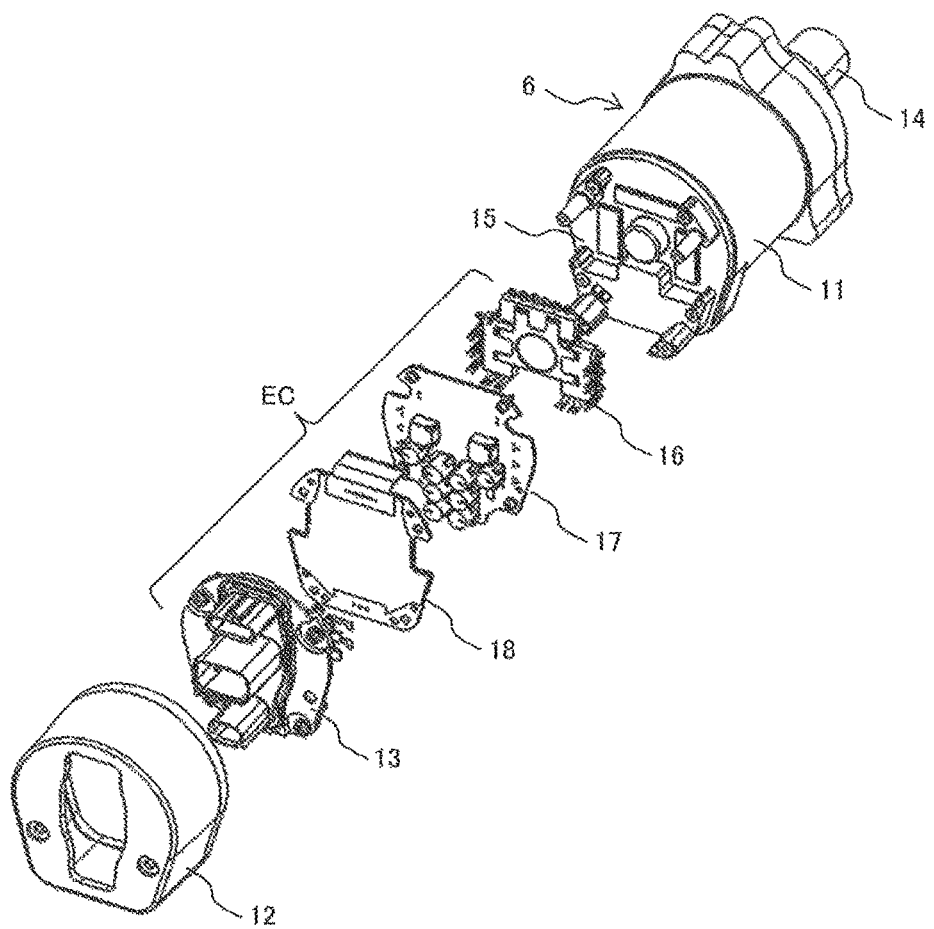
FIG. 3 is a perspective exploded view of the electric power steering device shown in FIG. 2.

FIG. 2 is a drawing showing the whole configuration of an electric power steering device which becomes the present embodiment. FIG. 3 is a drawing when disassembled components of the electric power steering device shown in FIG. 2 are viewed from an oblique direction. Each of FIG. 4 to FIG. 9 is a drawing showing a state in which each of the components is assembled according to the assembling order of each of the components. Therefore, in the following explanation, the explanation is described with reference to the drawings appropriately.

As shown in FIG. 2, an electric motor section 8 is composed of a cylindrical motor housing 11 made of aluminum or aluminum-based metal, such as aluminum alloy, and of an electric motor which is not shown in the drawings and which is accommodated in the motor housing 11. An electronic control unit 9 is composed of a metal cover 12 which is disposed on the opposite side to the output shaft in the axial direction of the motor housing 11 and which is made of aluminum, aluminum-based metal, such as aluminum alloy, or iron-based metal, and of an electronic control assembly which is not shown in the drawings and which is accommodated in the metal cover 12.

The motor housing 11 and the metal cover 12 are integrally fixed to each other by being caulked and fixed in a fixing area part in the circumferential direction formed at a facing end surface. The electronic control assembly accommodated in the inside of the metal cover 12 is composed of a power source circuit part for generating a required power source, a power conversion circuit part having a power switching element formed by, for example, IGBT or MOSFET for driving and controlling the electric motor section 8, and a control circuit part for controlling the power switching element. The output terminal of the power switching element is electrically connected to the input terminal of the electric motor via a bus bar.

A connector terminal assembly 13 is exposed from the end surface of the metal cover 12 located on the opposite side to the motor housing 11 through a hole portion formed to the metal cover 12. In addition, the connector terminal assembly 13 is fixed to fixing portions formed to the motor housing 11 with fixing screws. The connecter terminal assembly 13 is provided with a connector terminal forming portion 13A for power supply, a connector terminal forming portion 13B for a detection sensor, and with a control-statesending connector terminal forming portion 13C for sending a control state to an external device.

Then, in the electronic control assembly accommodated in the metal cover 12, power is supplied thereto from a power source via the connector terminal forming portion 13A for power supply which is made of synthetic resin, detected signals of a driving condition and the like are supplied thereto from various detection sensors via the detection-sensor connector terminal forming portion 13B, and a signal of the present control state of the electric power steering device is sent via the connector terminal forming portion 13C for sending a control state.

In FIG. 3, a perspective exploded view of the electric power steering device 6 is shown. A ring-shaped annular side yoke (now shown in the drawings) made of iron is fitted to the inside of the motor housing 11, and the electric motor (not shown in the drawings) is accommodated in the side yoke. An output portion 14 of the electric motor applies steering assist force to a rack via a gear. The specific configuration of the electric motor has been known well, its explanation is therefore omitted.

The motor housing 11 is made of aluminum alloy, and functions as a heat sink member for radiating the heat generated at the electric motor and the heat generated at the after-mentioned power source circuit part or power conversion circuit part to the atmosphere. The electric motor section 8 is composed of the electric motor and the motor housing 11.

An electronic control section EC is attached to an end surface portion 15 of the motor housing 11 which is located on the opposite side to the output portion 14 of the electric motor section 8. The electronic control section EC is composed of a power conversion circuit part 16, a power source circuit part 17, a control circuit part 18 and the connecter terminal assembly 13. Although the end surface portion 15 of the motor housing 11 is formed integrally with the motor housing 11, in addition to this, the end surface portion 15 may be separately formed, and then is integrated with the motor housing 11 with screws or welding.

Here, the power conversion circuit part 16, the power source circuit part 17 and the control circuit part 18 constitute redundancy systems, and each constitute a double system of a main electronic control part and an auxiliary electronic control part. Normally, the electric motor is controlled and driven by the main electronic control part. However, when abnormalities or failures occur to the main electronic control part, it is switched to the auxiliary electronic control part, and the electric motor is controlled and driven.

Therefore, as mentioned below, normally, when the heat from the main electronic control part is transferred to the motor housing 11, and abnormalities or failures occur to the main electronic control part, the main electronic control part is stopped, and the auxiliary electronic control part is operated, then the heat from the auxiliary electronic control part is transferred to the motor housing 11.

However, although it is not adopted to the present embodiment, the main electronic control part and the auxiliary electronic control part are united so as to function as normal electronic control parts, and when abnormalities or failures occur to one of the electronic control parts, the electric motor can be controlled and driven by the other of the electronic control parts by a half capacity. In this case, although the capacity of the electronic motor becomes half, a so-called power steering function is ensured. Therefore, in a normal case, the heat from the main electronic control part and the heat from the auxiliary electronic control part are transferred to the motor housing 11.

The electric control section EC is composed of the power conversion circuit part 16, the power source circuit part 17, the control circuit part 18 and the connector terminal assembly 13, and the power conversion circuit part 16, the power source circuit part 17, the control circuit part 18 and the connector terminal assembly 13 are arranged in this order in a direction away from the end surface portion 15. The control circuit part 18 is one for generating a control signal for driving a switching element of the power conversion circuit part 16, and is composed of a microcomputer, a peripheral circuit and the like. The power source circuit part 17 is one for generating the power source for driving the control circuit part 18 and the power source for the power conversion circuit part 16, and is composed of a capacitor, a coil, a switching element and the like. The power conversion circuit part 16 is one for adjusting power which flows the coil of the electric motor, and is composed of a three-phase switching element forming upper and lower arms.

In the electronic control section EC, mainly, the heat value of the power conversion circuit part 16 and the power source circuit part 17 is large, and the heat of the power conversion circuit part 16 and the power source circuit part 17 is radiated from the motor housing 11 made of aluminum alloy. The details of this configuration will be described below, using FIG. 4 to FIG. 9.

The connector terminal assembly 13 made of synthetic resin is provided between the control circuit part 18 and the metal cover 12, and is connected to a battery (power source) for a vehicle and another external control device which is not shown in the drawings. Of course, it goes without saying that the connector terminal assembly 13 is connected to the power conversion circuit part 16, the power source circuit part 17 and the control circuit part 18.

The metal cover 12 has a function for accommodating the power conversion circuit part 16, the power source circuit part 17 and the control circuit part 18, and liquid-tightly sealing them. In the present embodiment, the metal cover 12 is fixed to the motor housing 11 by being caulked.

Next, the configuration and the assembling method of each component will be explained based on FIG. 4 to FIG. 9. First, FIG. 4 shows the appearance of the motor housing 11, and FIG. 5 shows its cross section in the axial direction.

Figure 4:
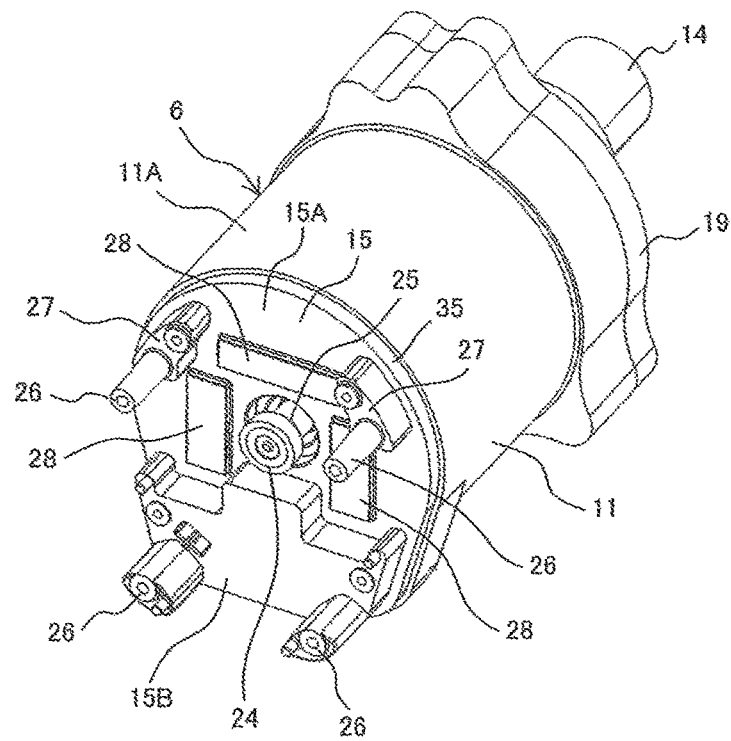
FIG. 4 is an external perspective view of a motor housing shown in FIG. 3.
Figure 5:
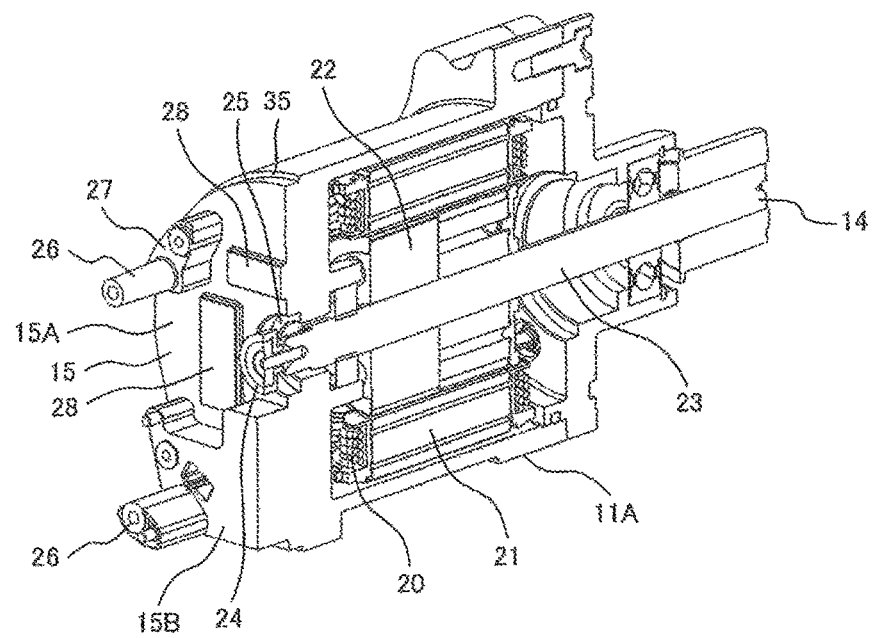
FIG. 5 is a sectional view of the motor housing shown in FIG. 4 when being axially cut.

In FIG. 4 and FIG. 5, the motor housing 11 is formed in a cylindrical shape and is composed of a side peripheral surface portion 11A, an end surface portion 15 closing one end of the side peripheral surface portion 11A, and an end surface portion 19 closing the other end of the side peripheral surface portion 11A. In the present embodiment, the motor housing 11 has a cylindrical shape having a bottom, and the side peripheral surface portion 11A is formed integrally with the end surface portion 15. In addition, the end surface portion 19 functions as a lid, so as to close the other end of the side peripheral surface portion 11A, after the electric motor is accommodated in the side peripheral surface portion 11A.

In addition, a motor-housing-side annular groove portion 35 having an annular groove opened radially outward is provided over the whole peripheral surface of the end surface portion 15. Here, the motor-housing-side annular groove portion 35 is a feature of the present embodiment, and it will be explained in detail by using FIG. 10 to FIG. 12, further explanation is therefore omitted here.

Figure 9:
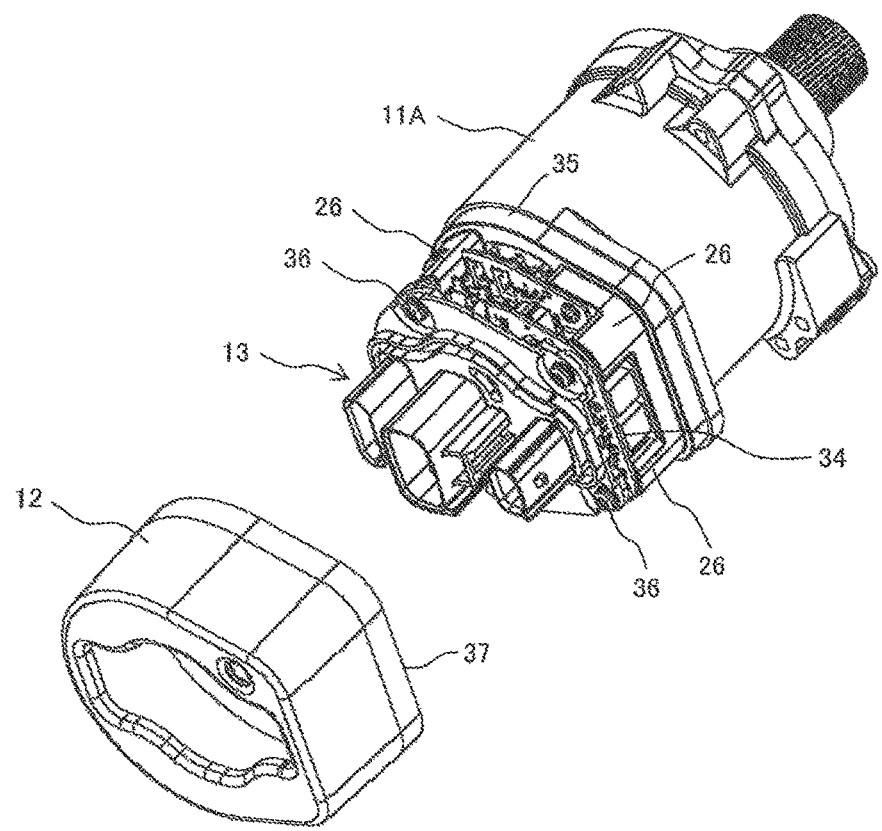
FIG. 9 is an external perspective view showing a state in which a connector terminal assembly is mounted on and fixed to the motor housing shown in FIG. 8.

Then, an opening end 37 (hereinafter is also referred to as a metal-cover-side annular distal end portion) of the metal cover 12 shown in FIG. 9 is disposed so as to face the motor-housing-side annular groove portion 35. The parts between the motor-housing-side annular groove portion 35 and the metal-cover-side annular distal end portion 37 of the metal cover 12 are liquid tightly joined to each other by a so-called liquid sealant.

As shown in FIG. 5, a stator 21 in which a coil 20 is wound around the iron core is fitted to the inside of the side peripheral surface portion 11A of the motor housing 11, and a rotor 22 having a permanent magnet embedded therein is rotatably accommodated in the stator 21. A rotation shaft 23 is fixed to the rotor 22, and one end of the rotation shaft 23 is an output portion 14 and the other end thereof is a rotation detection part 24 for detecting the rotation phase and the rotation speed of the rotation shaft 23. A permanent magnet is provided to the rotation detection part 24, and the rotation detection part 24 protrudes outward so as to pass through a through hole 25 provided to the end surface portion 15. Then, by a magnetism sensing portion composed of, for example, a GMR element which is not shown in the drawings, the rotation phase and the rotation speed of the rotation shaft 23 are detected.

Turning back to FIG. 4, a heat radiation region 15A of the power conversion circuit part 16 (see FIG. 3) and a heat radiation region 15B of the power source circuit part 17 (see FIG. 3) are formed on the surface of the end surface portion 15 located on the opposite side to the output portion 14 of the rotation shaft 23. A board-connector fixing projection portion 26 is integrally planted to each of the four corners of the end surface portion 15, and is formed with, inside thereof, a screw hole.

The board-connector fixing projection portion 26 is provided to fix the after-mentioned board of the control circuit part 18 and the connector terminal assembly 13. In addition, board receiving portion 27 having the same height as the after-mentioned power source heat radiation region 15B in the axial direction is formed to the board-connector fixing projection portion 26 planted from the after-mentioned power conversion heat radiation region 15A, and a screw hole is formed to the board receiving portion 27. The board receiving portion 27 is one for mounting and fixing the after-mentioned glass epoxy board 31 of the power source circuit part 17.

A plane region in the radial direction orthogonal to the rotation shaft 23 which forms the end surface portion 15 is divided into two regions. One of the two regions forms the power conversion heat radiation region 15A to which the power conversion circuit part 16 composed of power switching elements, such as MOSFET, is attached, and the other forms the power source heat radiation region 15B to which the power source circuit part 17 is attached. In the present embodiment, the area of the power conversion heat radiation region 15A is larger than that of the power source heat radiation region 15B, in order to ensure the installation area of the power conversion circuit part 16, because, as mentioned above, a double system is adopted.

The power conversion heat radiation region 15A and the power source heat radiation region 15B have level differences having different heights in the axial direction (direction in which the rotation shaft 23 extends). That is, the power source heat radiation region 15B is formed to have a level difference in a direction away from the power conversion heat radiation region 15A when viewed in the direction of the rotation shaft 23 of the electric motor. This level difference is set to have a length in which the power conversion circuit part 16 and the power source circuit part 17 do not interfere with each other when the power source circuit part 17 is disposed after the power conversion circuit part 16 is disposed.

Three long and narrow rectangular protruding heat radiation portions 28 are formed in the power conversion heat radiation region 15A. The after-mentioned double-system power conversion circuit part 16 is disposed on the protruding heat radiation portions 28. In addition, each of the protruding heat radiation portions 28 protrudes in a direction away from the electric motor when viewed in the direction of the rotation shaft 23 of the electric motor.

In addition, the power source heat radiation region 15B has a plane shape, and the after-mentioned power source circuit part 17 is disposed thereon. Therefore, the protruding heat radiation portions 28 each function as a heat radiation part for transferring the heat generated in the power conversion circuit part 16 to the end surface portion 15, and the power source heat radiation region 15B functions as a heat radiation part for transferring the heat generated in the power source circuit part 17 to the end surface portion 15.

In addition, the protruding heat radiation portions 28 can be omitted, and in this case, the power conversion heat radiation region 15A functions as a hear radiation part for transferring the heat generated in the power conversion circuit part 16 to the end surface portion 15. Here, in the present embodiment, the metal board of the power conversion circuit part 16 is welded to each of the protruding heat radiation portions 28 by friction agitation joining so as to be surely fixed.

In this way, in the end surface portion 15 of the motor housing 11 becoming the present embodiment, a heat sink member is omitted, and a length in the axial direction can be shortened. In addition, since the motor hosing 11 has a sufficient heat capacity, the heat of the power source circuit part 17 and the power conversion circuit part 16 can be efficiently radiated to the outside.

Figure 6:
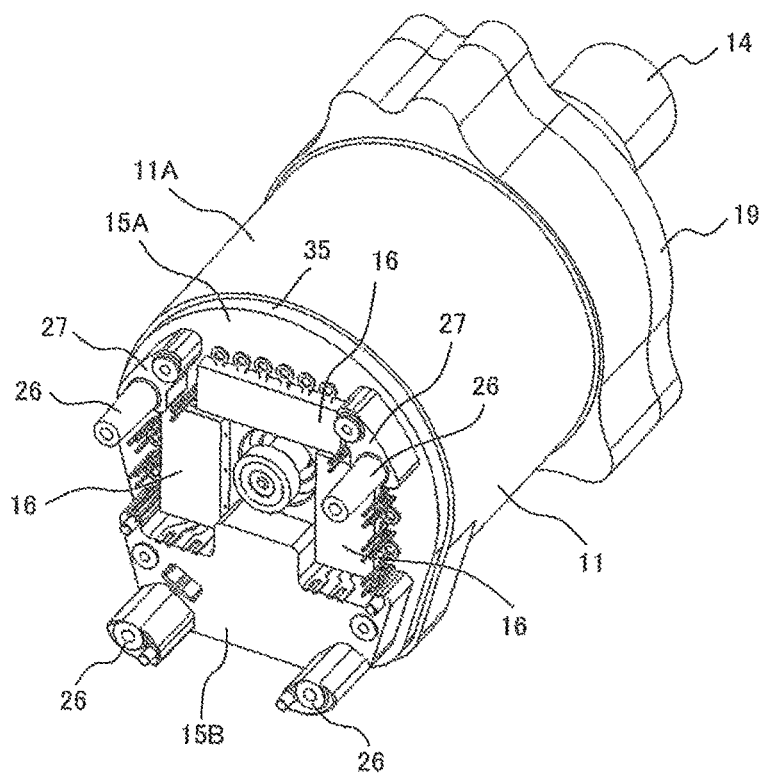
FIG. 6 is an external perspective view showing a state in which a power conversion circuit part is mounted on and fixed to the motor housing shown in FIG. 4.

Next, in FIG. 6, a state in which the power conversion circuit part 16 is disposed on the protruding heat radiation portions 28 (see FIG. 4) is shown. As shown in FIG. 6, the power conversion circuit part 16 constituted in a double-system is disposed on the protruding heat radiation portions 28 (see FIG. 4) formed in the power conversion heat radiation region 15A. Switching elements composing the power conversion circuit parts 16 are mounted on respective metal boards (here, aluminum-based metal is used), so as to radiate heat easily. Then, the metal boards are welded to the respective protruding heat radiation portions 28 by friction agitation joining.

Accordingly, the metal boards are firmly fixed to the respective protruding heat radiation portions 28 (see FIG. 4), and the heat generated in the switching elements can be efficiently transferred to the protruding heat radiation portions 28 (see FIG. 4). The heat transferred to the protruding heat radiation portions 28 (see FIG. 4) is diffused to the power conversion heat radiation region 15A. In addition, it is transferred to the side peripheral surface portion 11A of the motor housing 11, and then is radiated to the outside. Here, as mentioned above, since the height in the axial direction of the power conversion circuit part 16 is lower than that of the power source heat radiation region 15B, the power conversion circuit part 16 does not interfere with the after-mentioned power source circuit part 17.

In this way, the power conversion circuit part 16 is disposed on the protruding heat radiation portions 28 formed in the power conversion heat radiation region 15A. Consequently, the heat generated in the switching elements of the power conversion circuit part 16 can be efficiently transferred to the protruding heat radiation portions 28. Moreover, the heat transferred to the protruding heat radiation portions 28 is diffused to the power conversion heat radiation region 15A, is transferred to the side peripheral surface portion 11A of the motor housing 11, and then is radiated to the outside.

Figure 7:
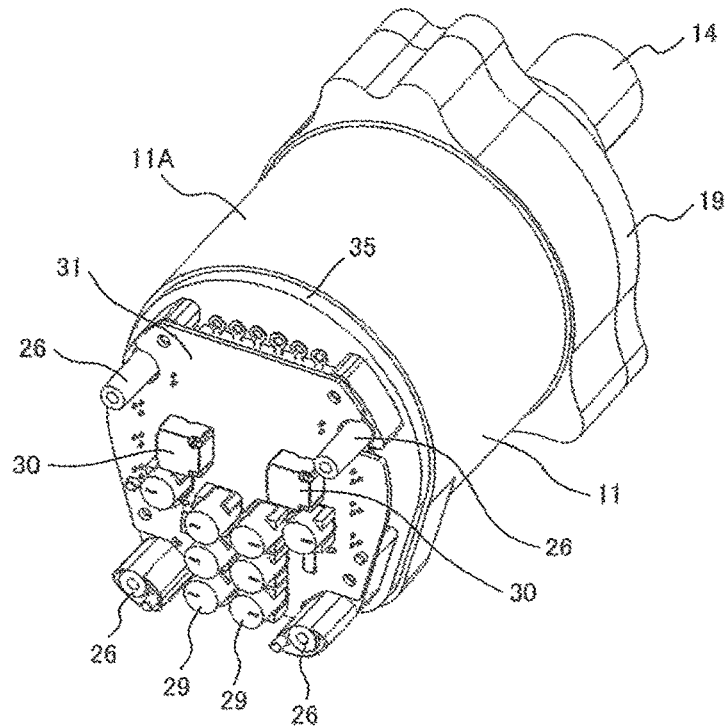
FIG. 7 is an external perspective view showing a state in which a power circuit part is mounted on and fixed to the motor housing shown in FIG. 6.

Next, in FIG. 7, a state in which the power source circuit part 17 is disposed over the power conversion circuit part 16. As shown in FIG. 7, the power source circuit part 17 is disposed on the power source heat radiation region 15B. Capacitors 29 and coils 30 composing the power source circuit part 17 are mounted on the glass epoxy board 31. The power source circuit part 17 also adopts a double system, and as is clear from FIG. 7, power source circuits composed of the capacitors 29 and the coils 30 are symmetrically formed. In addition, electric elements, such as capacitors, other than the switching elements of the power conversion circuit part 16 are mounted on the glass epoxy board 31.

The surface on the power source heat radiation region 15B (see FIG. 6) of the glass epoxy board 31 is fixed to the end surface portion 15 so as to come in contact with the power source heat radiation region 15B. In a method for the fixing, as shown in FIG. 7, the glass epoxy board 31 is fixed to screw holes provided to the board receiving portions 27 of the board-connector fixing projection portions 26 by fixing screws which are not shown in the drawings. In addition, it is fixed to screw holes provided to the power source heat radiation region 15B (see FIG. 6) by fixing screws which are not shown in the drawings.

In addition, since the power circuit part 17 is formed by the glass epoxy board 31, double-side mounting becomes possible. Then, GMR elements, which are not shown in the drawings, and a rotation phase detection part and a rotation speed detection part composed of detection circuits of the GMR elements are mounted on the surface on the power source heat radiation region 15B (see FIG. 6) side of the glass epoxy board 31 so as to detect rotation phase and rotation speed, in cooperation with the rotation detection part 24 (see FIG. 5) provided to the rotation shaft 23 (see FIG. 5).

In this way, since the glass epoxy board 31 is fixed so as to come in contact with the power source heat radiation region 15B (see FIG. 6), the heat generated in the power source circuit part 17 can be efficiently transferred to the power source heat radiation region 15B (see FIG. 6). The heat transferred to the power source heat radiation region 15B (see FIG. 6) is diffused to the side peripheral surface portion 11A of the motor housing 11, and is radiated to the outside. Here, one of adhesive having well heat transfer, heat radiating grease and a heat radiating sheet can be interposed between the glass epoxy board 31 and the power source heat radiation region 15B (see FIG. 6), and thereby heat transfer performance can be further improved.

In this way, the power source circuit part 17 is disposed on the power source heat radiation region 15B. The surface on the power source heat radiation region 15B side of the glass epoxy board 31 on which circuit elements of the power source circuit part 17 are mounted is fixed to the end surface portion 15 so as to come in contact with the power source heat radiation region 15B. Therefore, the heat generated in the power source circuit part 17 can be efficiently transferred to the power source heat radiation region 15B. The heat transferred to the power source heat radiation region 15B is diffused to the side peripheral surface portion 11A of the motor housing 11, and is radiated to the outside.

Figure 8:
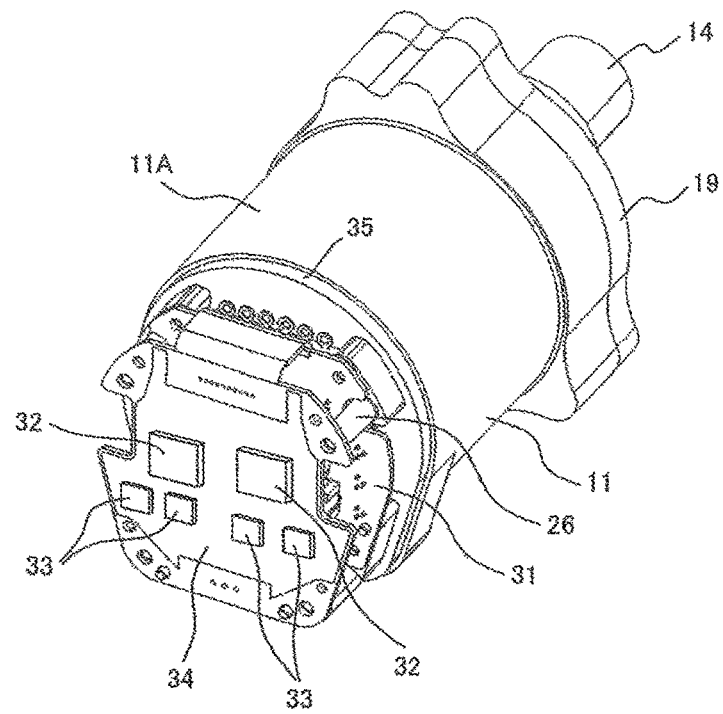
FIG. 8 is an external perspective view showing a state in which a control circuit part is mounted on and fixed to the motor housing shown in FIG. 7.

Next, in FIG. 8, a state in which the control circuit part 18 is disposed over the power source circuit part 17. As shown in FIG. 8, the control circuit part 18 is disposed above the power source circuit part 17. Microcomputers 32 and peripheral circuits 33 composing the control circuit part 18 are mounted on a glass epoxy board 34. A double system is also adopted to the control circuit part 18, and, as is clear from FIG. 8, control circuits constituted of the microcomputers 32 and the peripheral circuits 33 are symmetrically formed. In addition, the microcomputers 23 and the peripheral circuits 33 may be provided to the surface on the power source circuit part 17 side of the glass epoxy board 34.

As shown in FIG. 8, the glass epoxy board 34 is fixed to screw holes provided to the top portions of the board-connector fixing projection portions 26 (see FIG. 7) with fixing screws which are not shown in the drawings, in a state of being sandwiched by the connector terminal assembly 13. The space between the glass epoxy board 31 of the power source circuit part 17 (see FIG. 7) and the glass epoxy board 34 of the control circuit part 18 serves as a space in which the capacitors 29 and the coils 30 of the power source circuit part 17 are disposed.

Next, in FIG. 9, a state in which the connector terminal assembly 13 is disposed over the control circuit part 18 is shown. As shown in FIG. 9, the connecter terminal assembly 13 is disposed above the control circuit part 18. Then, the connector terminal assembly 13 is fixed to screw holes provided to the top portions of the board-connector fixing projection portions 26 with fixing screws 36 so as to sandwich the control circuit part 18. In this state, as shown in FIG. 3, the connector terminal assembly 13 is connected to the power conversion circuit part 16, the power source circuit part 17 and the control circuit part 18.

Moreover, after this, the metal-cover-side annular distal end portion 37 of the metal cover 12 is disposed so as to cover the motor-housing-side annular groove portion 35 of the motor housing 11 from the outside, and is fixed by caulking fixing portions provided along the circumferential direction of the metal cover 12.

Figure 10:
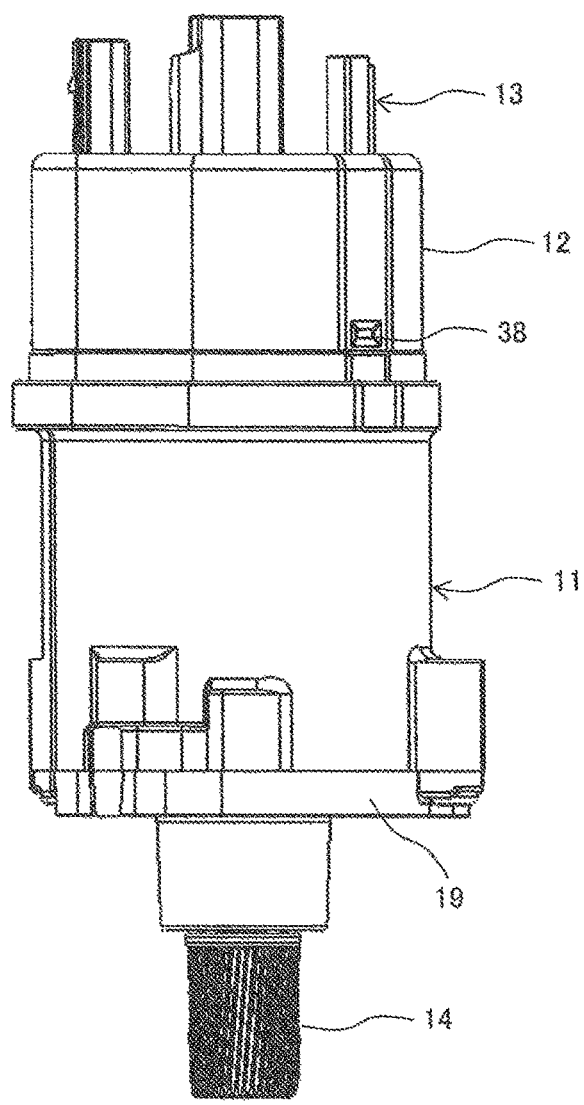
FIG. 10 is an external view of the electric power steering device according to an embodiment of the present invention, after caulking and fixing a metal cover to the motor housing.

As shown in FIG. 10, the caulking fixing portions 38 are formed at an interval of approximately 120° with the axial line of the rotation shaft 23 as a center, on the outer periphery of the metal cover 12. In FIG. 10, the appearance of the electric power steering device 6 in a state in which the motor housing 11 is fixed to the metal cover 12 by caulking is shown. In addition, in FIG. 11, the cross-section of the electric power steering device 6 before the metal cover 12 is fixed to the end surface portion 15 of the motor housing 11 is shown.

Figure 11:
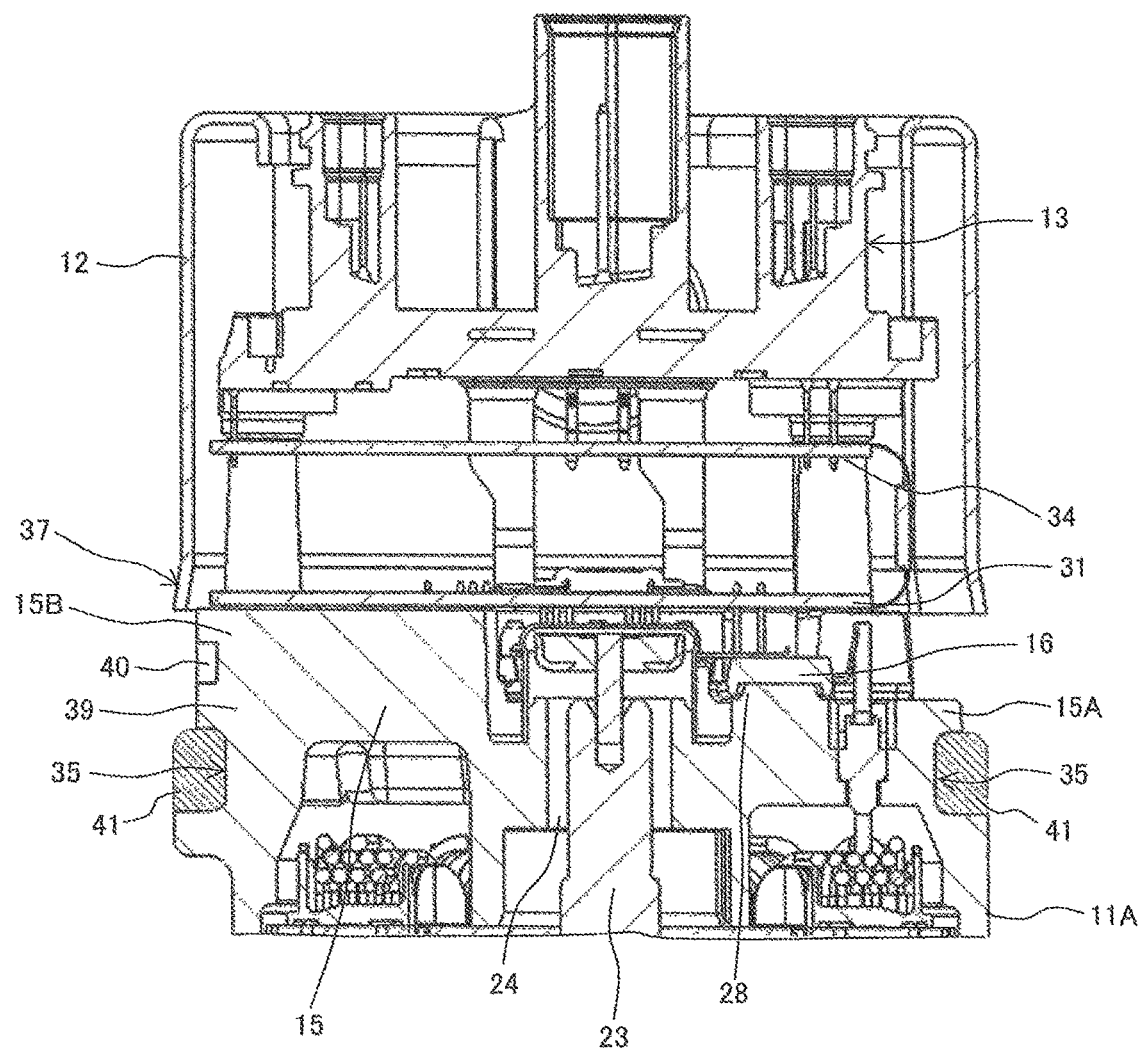
FIG. 11 is a sectional view of a main part of the electric power steering device before caulking and fixing the metal cover shown in FIG. 10 to the motor housing.

In FIG. 10 and FIG. 11, a plurality of the caulking fixing portions 38 (three caulking fixing portions) are formed on the outer peripheral surface of the metal cover 12. Each of the caulking fixing portions 38 is formed such that the wall surface of the metal cover 12 is plastically deformed and caulked by being pushed with a push-in tool to a caulking recess 40 formed of, for example, a caulking hole, or a caulking groove provided on a fixing wall 39 which extends from the motor-housing-side annular groove portion 35 formed over the whole peripheral surface of the end surface portion 15 of the motor housing 11 toward the connecter terminal assembly 13 in the axial direction and which forms the power conversion heat radiation region 15A and the power source heat radiation region 15B. The positioning of the metal cover 12 in the axial direction is carried out by using the connector terminal assembly 13, and in a state in which the metal cover 12 has been positioned in the axial direction, the wall surface of the metal cover 12 is pushed into the caulking recess 40 with a push-in tool so as to be caulked.

In addition, the space formed by the motor-housing-side annular groove portion 35, at which the metal-cover-side annular distal end portion 37 of the metal cover 12 is disposed, is filled with a liquid sealant 41 for liquid tightly sealing without any clearance. Therefore, since a sealing region for liquid tightly sealing is formed between the caulking fixing portions 38 and the metal-cover-side annular distal end portion 37 of the metal cover 12, the entering of salt water and the like is suppressed at the sealing region. Consequently, since salt water and the like do not enter into the caulking fixing portions 38, the corrosion of the caulking fixing portions 38 is suppressed, and thereby mechanical reliability can be improved. Moreover, since the entering of the salt water and the like into the electronic control unit 9 is suppressed, electrical reliability can be also improved.

Next, the configuration near the joining region between the metal-cover-side annular distal end portion 37 and the motor-housing-side annular groove portion 35 will be explained in more details by using FIG. 12 and FIG. 13.

Figure 12:
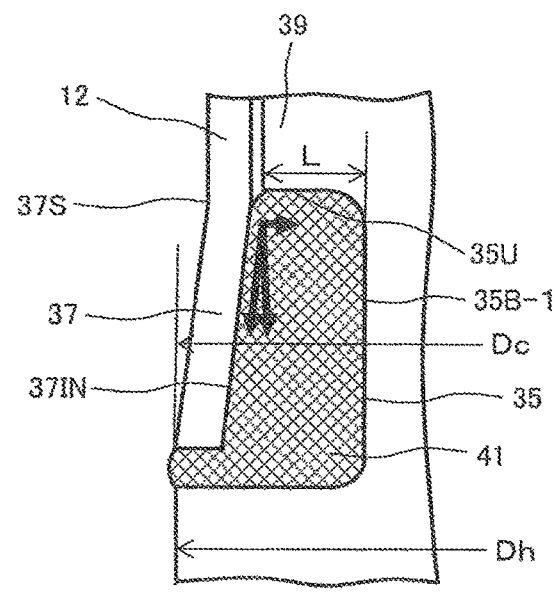
FIG. 12 is a sectional view showing a state in which the metal cover shown in FIG. 11 is assembled to the motor housing.

In FIG. 12, an outer circumferential diameter Dc of the tip end of the metal-cover-side annular distal end portion 37 of the metal cover 12 is substantially the same diameter as an outer circumferential diameter Dh of the end surface portion 15 of the motor housing 11, and their peripheral surfaces are formed on the same surface (flush) apparently. In addition, the motor-housing-side annular groove portion 35 formed on the outer peripheral surface of the end surface portion 15 of the motor housing 11 is formed in a shape (shape recessed inward) which retreats inward by a predetermined distance from the fixing wall 39 in the radial direction orthogonal to the axial line of the motor housing 11 which is the same as the axial line of the rotation shaft 23 (see FIG. 11).

On the other hand, the metal-cover-side annular distal end portion 37 of the metal cover 12 is formed such that the opening surface thereof is widened outward by bending processing, and an annular inclined surface 37IN inclined so as to be widened outward in the radial direction of the metal cover 12 is formed to the inner peripheral surface of the metal-cover-side annular distal end portion 37. A bending start point 37S of the annular inclined surface 37IN is bent from the vicinity of a wall surface 35U on the upper side on the drawing of the motor-housing-side annular groove portion 35, so as to be widened.

Then, as shown in FIG. 11, the liquid sealant 41 is applied to the motor-housing-side annular groove portion 35 so as to fill it, before the metal cover 12 is attached. Here, as mentioned above, the liquid sealant 41 has adhesiveness and viscosity, and when the metal-cover-side annular distal end portion 37 is pushed toward the end surface 15 of the motor housing 11, tensile force is applied to the liquid sealant 41 which comes in contact with the annular inclined surface 37IN which is the inner peripheral surface of the metal-cover-side annular distal end portion 37. Consequently, a phenomenon occurs, phenomenon in which the liquid sealant 41 filled in the motor-housing-side annular groove portion 35 is pulled and moved along the movement of the annular inclined surface 37IN of the metal-cover-side annular distal end portion 37.

However, in the present embodiment, since the annular inclined surface 37IN inclined so as to be widened toward the outside in the radial direction of the metal cover 12 is formed on the inner peripheral surface of the metal-cover-side annular distal end portion 37, as shown by arrows, the tensile force generated when coming in contact with the liquid sealant 41 is dispersed in at least a direction along the annular inclined surface 37IN, a direction in which the metal cover 12 is pushed, and the radial direction. Consequently, even if the liquid sealant 41 is pulled along the movement of the annular inclined surface 37IN of the metal-cover-side annular distal end portion 37, its load is dispersed, and thereby the formation of a space due to the movement of the liquid sealant 41 is suppressed.

In this way, a phenomenon is suppressed, phenomenon in which the liquid sealant 41 filled in the motor-housing-side annular groove portion 35 is pulled and moved along the movement of the annular inclined surface 37IN of the metal-cover-side annular distal end portion 37 when the metal-cover-side annular distal end portion 37 is pushed toward the end surface portion 15 of the motor housing 11. Consequently, the space in which the liquid sealant 41 does not exist in the motor-housing-side annular groove portion 35 is hardly formed, a sealing length becomes long, and the entering of salt water and the like into the metal cover 12 is suppressed, as a result of which mechanical and electrical reliability can be improved.

Figure 13:
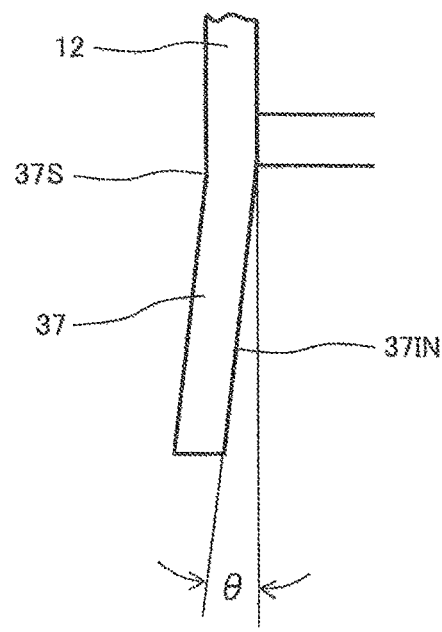
FIG. 13 is a sectional view showing the shape of an inclined surface at the distal end portion of the metal cover shown in FIG. 11.

Here, as shown in FIG. 13, if an inclination angle $\theta$ of the annular inclined surface 37IN of the metal-cover-side annular distal end portion 37 of the metal cover 12 which becomes the present embodiment is set to a range of preferably 5° to 9°, the liquid sealant 41 can sufficiently remain.

Then, relative to the length in the axial direction of the motor-housing-side annular groove portion 35, the ratio of the contact of the liquid sealant 41 with the annular inclined surface 37IN of the metal-cover-side annular distal end portion 37 was measured. In this case, the metal cover 12 was circumferentially divided into eight parts at equal intervals, the ratio of the adhesive length (adhesive length/length in the axial direction of the motor-housing-side annular groove portion 35) in each of the parts was determined, and then was averaged.

In the conventional configuration shown in FIG. 16, the ratio of the adhesive length was approximately 43%. In contrast, when the inclination angle $\theta$ of the annular inclined surface 37IN was 5°, the ratio of the adhesive length was approximately 81%. When the inclination angle $\theta$ of the annular inclined surface 37IN was 7°, the ratio of the adhesive length was approximately 89%, and when the inclination angle $\theta$ of the annular inclined surface 37IN was 9°, the ratio of the adhesive length was approximately 92%. Therefore, it is sufficient if the inclination angle $\theta$ of the annular inclined surface 37IN is set in a range of 4° to 12° for some extent of allowance.

In addition, as mentioned above, since a sufficient sealing length by the liquid sealant 41 can be ensured by the annular inclined surface 37IN of the metal-cover-side annular distal end portion 37, the outer circumferential diameter Dc at the tip end of the metal-cover-side annular distal end portion 37 of the metal cover 12 can be set to the approximately same diameter as the outer circumferential diameter Dh of the end surface portion 15 of the motor housing 11, and thereby the diameter of this kind of the electric drive device can be suppressed from being large.

Second Embodiment

Figure 14:
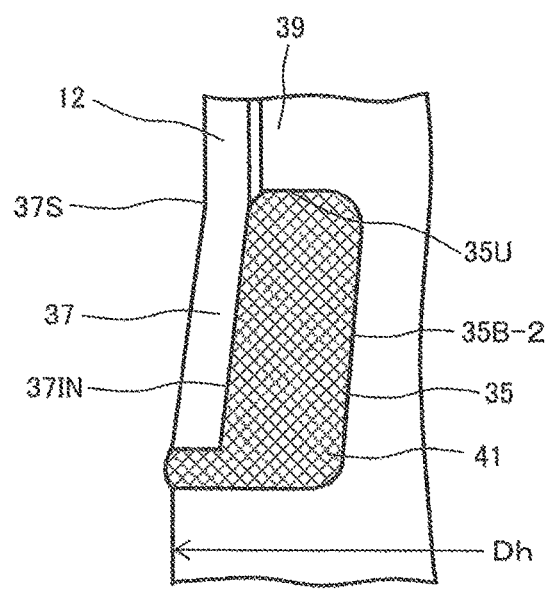
FIG. 14 is a sectional view showing another shape of a motor housing annular groove portion shown in FIG. 11.

As shown in FIG. 12, although a side wall 35B-1 on the radial direction side of the motor-housing-side annular groove portion 35 is formed along the axial line of the motor housing 11, as shown in FIG. 14, it may be formed as a wall surface 35B-2 along the inclination of the annular inclined surface 37IN of the metal-cover-side annular distal end portion 37. Consequently, the filling amount of the liquid sealant 41 can be reduced.

Third Embodiment

Figure 15:
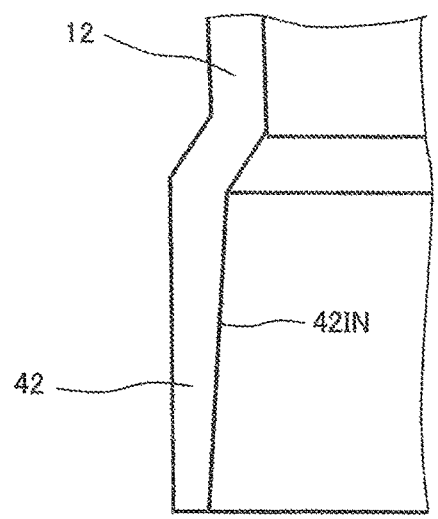
FIG. 15 is a sectional view showing another shape of the inclined surface at the distal end portion of the metal cover shown in FIG. 11.

In an embodiment shown in FIG. 12, the opening surface of the metal-cover-side annular distal end portion 37 of the metal cover 12 is bent so as to be widened outward to form the annular inclined surface 371N. In contrast to this, in FIG. 15, without forming the annular inclined surface 371N by bending, a metal-cover-side annular distal end portion 42 of the metal cover 12 is formed along the axial line of the motor housing 11, and only the inner peripheral surface thereof is formed with an annular inclined surface 42IN. In addition, the annular inclined surface 42IN can be formed by press processing or cutting processing.

According to this configuration, as mentioned above, a phenomenon is also suppressed, phenomenon in which the liquid sealant 41 filled in the motor-housing-side annular groove portion 35 is pulled and moved along the movement of the annular inclined surface 421N of the metal-cover-side annular distal end portion 42 when the metal-cover-side annular distal end portion 37 is pushed toward the end surface portion 15 of the motor housing 11. Consequently, the space in which the liquid sealant 41 does not exist in the motor-housing-side annular groove portion 35 is hardly formed, a sealing length becomes long, and the entering of salt water and the like into the metal cover 12 is suppressed, as a result of which mechanical and electrical reliability can be improved.

In addition, in each of the embodiments mentioned above, synthetic resin having adhesiveness is used for the liquid sealant 41 for liquid tightness, and in the present embodiments, a silicon-rubber-based elastic adhesive is used. The silicon-rubber-based elastic adhesive has a property in which external stresses, such as vibration and impacts, are absorbed and in which stress is hardly concentrated to an adhesion interface. Therefore, although, in an electric power steering device on which vibration and impacts act, there is possibility that the adhesion interface peels off, and liquid-tightness function is lost, by using a silicon-rubber-based elastic adhesive, the possibility of losing the liquid-tightness function can be reduced. In addition, in the present embodiments, since the sealing is carried out with the liquid sealant 41 having adhesiveness, an O-ring for liquid tightness which has been used conventionally can be omitted. Consequently, it is not necessary to form an accommodation groove for accommodating an O-ring to the fixing wall 39, and the rise of a manufacturing cost can be suppressed.

This silicon based-elastic adhesive (liquid sealant 41) may be a liquid gasket (FIPG: FORMED IN PLACE GASKET) having adhesion function, and one made of a material which is cured at a room temperature or by heating can be used.

In addition, since the metal cover 12 is fixed to the motor housing 11 by the caulking fixing portions 38 without using fixing screws, the appearance shape can be small, and, moreover, the weight can be reduced. Furthermore, although when an O-ring is used, an accommodation groove for accommodating the O-ring needs to be formed, in a case of the present embodiments, since the O-ring is not used, the processing of the accommodation groove is not necessary, and thereby the rise of a manufacturing cost can be suppressed.

In addition, the liquid sealant 41 is formed as a high heat radiation liquid sealant 41 in which a material having an excellent heat transfer, such as alumina, is kneaded, and, in combination with a large adhesive area, the heat of the power conversion heat radiation region 15A and the power source heat radiation region 15B can be efficiently radiated to the metal cover 12. Consequently, the heat from the electric components composing the power source circuit part and the power conversion circuit part can be efficiently radiated to the outside, and miniaturization becomes possible.

In the embodiments mentioned above, although, as a fixing means for fixing the metal cover 12 to the motor housing 11 without fixing screws, the caulking fixing portions 38 are formed to respective three places, a caulking fixing portion may be formed over the whole periphery of the metal cover.

As mentioned above, according to the present invention, the present invention includes: a motor-housing-side annular groove portion formed on the outer peripheral surface of the end surface portion of an motor housing which is located on an opposite side to the output portion of the rotation shaft of an electric motor, and formed by an annular groove retreating inward in the radial direction orthogonal to the axial line of the motor housing; and a cover-side annular distal end portion formed at the opening end of a cover covering an electronic control unit for controlling the electric motor, and facing the annular groove of the motor-housing-side annular groove portion from the outside, wherein a liquid sealant is filled in the space between the motor-housing-side annular groove portion and the cover-side annular distal end portion in a state in which the cover-side annular distal end portion is disposed so as to face the motor-housing-side annular groove portion, and wherein an annular inclined surface inclined so as to be widened outward in the radial direction of the cover is formed on the inner peripheral surface of the cover-side annular distal end portion.

According to the above configuration, since the annular inclined surface inclined so as to be widened to the outer side in the radial direction of the metal cover is formed to the inner peripheral surface of the metal-cover-side annular distal end portion, when the metal-cover-side annular distal end portion is pushed to the end surface side of the motor housing, pushing-in force acting on the liquid sealant filled in the motor-housing-side annular groove portion is dispersed, the movement of the liquid sealant caused by being pulled along the movement of the inner peripheral surface of the metal-cover-side annular distal end portion is suppressed, and consequently, the space in which the liquid sealant does not exist can be suppressed from being formed.

In addition, the present invention is not limited to the above embodiments, and various variations are included. For example, the above embodiments have been explained in detail to facilitate understanding the present invention, and each of them is not always limited to one having all the configurations explained above. In addition, a part of the configuration of one embodiment can be replaced to the configuration of another embodiment. Moreover, the configuration of one embodiment can be also added to the configuration of another embodiment. Furthermore, adding, removing or replacement of another configuration can be possible relative to a part of the configuration of each of the embodiments.

As an electric drive device based on the embodiments explained above, the following aspects can be considered.

That is, the electric drive device, in one aspect thereof, includes: a motor housing in which an electric motor for driving a mechanical system control element is accommodated; an electronic control unit for driving the electric motor, the electronic control unit being disposed on an end surface portion side of the motor housing that is an opposite side to an output portion of a rotation shaft of the electric motor; a cover for covering the electronic control unit; a motor-housing-side annular groove portion formed on an outer peripheral surface of an end surface portion of the motor housing which is located on an opposite side to the output portion of the rotation shaft of the electric motor, and formed by an annular groove retreating inward in a radial direction orthogonal to an axial line of the motor housing; and a cover-side annular distal end portion formed at an opening end of the cover covering the electronic control unit for controlling the electric motor, and facing the annular groove of the motor-housing-side annular groove portion from an outside, wherein a liquid sealant is filled in a space between the motor-housing-side annular groove portion and the cover-side annular distal end portion in a state in which the cover-side annular distal end portion is disposed so as to face the motor-housing-side annular groove portion, and wherein an annular inclined surface inclined so as to be widened outward in a radial direction of the cover is formed on an inner peripheral surface of the cover-side annular distal end portion.

In a preferable aspect of the electric drive device, in the cover-side annular distal end portion of the cover, by bending processing, the annular inclined surface is formed.

In another preferable aspect, in any of aspects of the electric drive device, in the cover-side annular distal end portion of the cover, by press processing or cutting processing, the annular inclined surface is formed.

In yet another aspect, in any of aspects of the electric drive device, a wall surface on a radial direction side of the motor-housing-side annular groove portion is formed along the axial line of the motor housing.

In yet another aspect, in any of aspects of the electric drive device, a wall surface on a radial direction side of the motor-housing-side annular groove portion is formed along the annular inclined surface of the cover-side annular distal end portion.

In addition, as an electric power steering device based on the embodiments explained above, the following aspects can be considered.

That is, the electric power steering device, in one aspect thereof, includes: an electric motor for applying steering auxiliary force to a steering shaft based on an output from a torque sensor which detects a rotation direction and a rotation torque of the steering shaft; a motor housing in which the electric motor is accommodated; an electronic control unit for driving the electric motor, the electronic control unit being disposed on an end surface portion side of the motor housing that is an opposite side to an output portion of a rotation shaft of the electric motor; a cover for covering the electronic control unit; a motor-housing-side annular groove portion formed on an outer peripheral surface of an end surface portion of the motor housing which is located on an opposite side to the output portion of the rotation shaft of the electric motor, and formed by an annular groove retreating inward in a radial direction orthogonal to an axial line of the motor housing; and a cover-side annular distal end portion formed at an opening end of the cover covering the electronic control unit for controlling the electric motor, and facing the annular groove of the motor-housing-side annular groove portion from an outside, wherein a liquid sealant is filled in a space between the motor-housing-side annular groove portion and the cover-side annular distal end portion in a state in which the cover-side annular distal end portion is disposed so as to face the motor-housing-side annular groove portion, and wherein an annular inclined surface of the cover-side annular distal end portion, which is inclined so as to be widened outward in a radial direction of the cover, is formed on an inner peripheral surface of the cover-side annular distal end portion.

In a preferable aspect of the electric power steering device, in the cover-side annular distal end portion of the cover, by bending processing, the annular inclined surface is formed.

In yet another aspect, in any of aspects of the electric power steering device, in the cover-side annular distal end portion of the cover, by press processing or cutting processing, the annular inclined surface is formed.

In yet another aspect, in any of aspects of the electric power steering device, a wall surface on a radial direction side of the motor-housing-side annular groove portion is formed along the axial line of the motor housing.

In yet another aspect, in any of aspects of the electric power steering device, a wall surface on a radial direction side of the motor-housing-side annular groove portion is formed along the annular inclined surface of the cover-side annular distal end portion.

The invention claimed is:

1. An electric drive device comprising:
  a motor housing in which an electric motor for driving a mechanical system control element is accommodated;
  an electronic control unit for driving the electric motor, the electronic control unit being disposed on an end surface portion side of the motor housing that is an opposite side to an output portion of a rotation shaft of the electric motor;
  a cover for covering the electronic control unit;
  a motor-housing-side annular groove portion formed on an outer peripheral surface of an end surface portion of the motor housing which is located on an opposite side to the output portion of the rotation shaft of the electric motor, and formed by an annular groove retreating inward in a radial direction orthogonal to an axial line of the motor housing; and
  a cover-side annular distal end portion formed at an opening end of the cover covering the electronic control unit for controlling the electric motor, and facing the annular groove of the motor-housing-side annular groove portion from an outside,
  wherein a liquid sealant is filled in a space between the motor-housing-side annular groove portion and the cover-side annular distal end portion in a state in which the cover-side annular distal end portion is disposed so as to face the motor-housing-side annular groove portion, and
  wherein an annular inclined surface inclined so as to be widened outward in a radial direction of the cover is formed on an inner peripheral surface of the cover-side annular distal end portion.

2. The electric drive device according to claim 1, wherein, in the cover-side annular distal end portion of the cover, by bending processing, the annular inclined surface is formed.

3. The electric drive device according to claim 1, wherein, in the cover-side annular distal end portion of the cover, by press processing or cutting processing, the annular inclined surface is formed.

4. The electric drive device according to claim 1, wherein a wall surface on a radial direction side of the motor-housing-side annular groove portion is formed along the axial line of the motor housing.

5. The electric drive device according to claim 1, wherein a wall surface on a radial direction side of the motorhousing-side annular groove portion is formed along the annular inclined surface of the cover-side annular distal end portion.

6. An electric power steering device comprising:
- an electric motor for applying steering auxiliary force to a steering shaft based on an output from a torque sensor which detects a rotation direction and a rotation torque of the steering shaft;
- a motor housing in which the electric motor is accommodated;
- an electronic control unit for driving the electric motor, the electronic control unit being disposed on an end surface portion side of the motor housing that is an opposite side to an output portion of a rotation shaft of the electric motor;
- a cover for covering the electronic control unit;
- a motor-housing-side annular groove portion formed on an outer peripheral surface of an end surface portion of the motor housing which is located on an opposite side to the output portion of the rotation shaft of the electric motor, and formed by an annular groove retreating inward in a radial direction orthogonal to an axial line of the motor housing; and
- a cover-side annular distal end portion formed at an opening end of the cover covering the electronic control unit for controlling the electric motor, and facing the annular groove of the motor-housing-side annular groove portion from an outside,
- wherein a liquid sealant is filled in a space between the motor-housing-side annular groove portion and the cover-side annular distal end portion in a state in which the cover-side annular distal end portion is disposed so as to face the motor-housing-side annular groove portion, and
- wherein an annular inclined surface of the cover-side annular distal end portion, which is inclined so as to be widened outward in a radial direction of the cover, is formed on an inner peripheral surface of the cover-side annular distal end portion.

7. The electric power steering device according to claim 6, wherein, in the cover-side annular distal end portion of the cover, by bending processing, the annular inclined surface is formed.

8. The electric power steering device according to claim 6, wherein, in the cover-side annular distal end portion of the cover, by press processing or cutting processing, the annular inclined surface is formed.

9. The electric power steering device according to claim 6, wherein a wall surface on a radial direction side of the motor-housing-side annular groove portion is formed along the axial line of the motor housing.

10. The electric power steering device according to claim 6, wherein a wall surface on a radial direction side of the motor-housing-side annular groove portion is formed along the annular inclined surface of the cover-side annular distal end portion.

* * * * *